United States Patent
Barbieri

(10) Patent No.: US 7,894,688 B2
(45) Date of Patent: Feb. 22, 2011

(54) METHOD FOR CREATING AN ICON, REPRESENTING A GROUP OF IMAGES, COMPUTER SYSTEM, COMPUTER PROGRAM PRODUCT AND A DATA CARRIER ARRANGED FOR PERFORMING THE METHOD

(75) Inventor: Mauro Barbieri, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 934 days.

(21) Appl. No.: 10/598,228

(22) PCT Filed: Feb. 21, 2005

(86) PCT No.: PCT/IB2005/050630

§ 371 (c)(1), (2), (4) Date: Aug. 22, 2006

(87) PCT Pub. No.: WO2005/088477

PCT Pub. Date: Sep. 22, 2005

(65) Prior Publication Data

US 2007/0143714 A1    Jun. 21, 2007

(30) Foreign Application Priority Data

Mar. 2, 2004   (EP) .................................. 04100828

(51) Int. Cl.
*G06K 9/36* (2006.01)

(52) U.S. Cl. ...................... 382/276; 382/277; 382/286; 382/291; 382/293; 382/295

(58) Field of Classification Search ................. 382/276, 382/277, 286, 291, 293, 295
See application file for complete search history.

(56) References Cited

U.S. PATENT DOCUMENTS

| | | | |
|---|---|---|---|
| 5,831,616 A | 11/1998 | Lee | |
| 6,247,009 B1 | 6/2001 | Shiiyama et al. | |
| 6,301,586 B1 | 10/2001 | Yang et al. | |
| 2001/0048802 A1 | 12/2001 | Nakajima et al. | |
| 2003/0117651 A1* | 6/2003 | Matraszek et al. | 358/1.18 |
| 2004/0201752 A1* | 10/2004 | Parulski et al. | 348/231.99 |

FOREIGN PATENT DOCUMENTS

WO    WO03017659 A1    2/2003

OTHER PUBLICATIONS

Yeung M et al: "Video Visualization for Compact Presentation and Fast Browsing of Pictorial Content"; IEEE Transactions on Circuits and Systems for Video Technology, IEEE Inc., New York, US; vol. 7, No. 5, Oct. 1, 1997; XP000703544.
Branscombe M.: "Getting to Know XP Multimedia"; Article—PC Answers, Issue 106, May 2002; XP0022330622.

* cited by examiner

*Primary Examiner*—Anand Bhatnagar
*Assistant Examiner*—Mike Rahmjoo

(57) ABSTRACT

The present invention relates to a method for creating an icon (11, 12), representing a group of images comprising a plurality of images (1, 2, . . . , N). The icon is composed of a selection of images from that group of images. The method comprises: —determining a relative importance ($I_1, \ldots I_N$) of each image (1, 2, . . . N) and —generating an icon composed of a selection of images based on the determined relative importance of each image.

14 Claims, 4 Drawing Sheets

METHOD FOR CREATING AN ICON, REPRESENTING A GROUP OF IMAGES, COMPUTER SYSTEM, COMPUTER PROGRAM PRODUCT AND A DATA CARRIER ARRANGED FOR PERFORMING THE METHOD

FIELD OF THE INVENTION

The invention relates to a method for creating an icon, representing a group of images comprising a plurality of images, where the icon is composed of a selection of images from that group of images. The invention further relates to a computer system, computer program product and a data carrier.

BACKGROUND

Graphical user interfaces of, for instance, personal computers, digital cameras or other similar devices, may be used to store, retrieve, print and watch digital images, such as photos. Nowadays it is also possible to view your personal images on a remote location via a web browser, that are stored by, for instance, a photo service. The user may select images to be printed by the photo service.

A single device may comprise hundreds or even thousands of images. In order to organize such big amounts of data, the images are usually divided in albums or groups. Such a group is represented by an icon and its associated metadata such as a title, date etc. When dealing with large collections of images, a user prefers to browse and search through such a collection using so-called group-based search tools.

Rather than using a fixed predetermined icon, in known graphical interfaces it is often possible to select a representative image from the group to be used as an icon for that group. This allows the user to find the group that he/she was looking for more easily. However, it is often very difficult to select a single image as representative for the entire group. Not only does this demand several actions by the user, but since a single group may comprise hundreds images, it may also be difficult for the user to select a single image as representative for the group.

Some media browser interfaces automatically select an image that may be representative for the group, as for instance the first or last image of a group. It is also known to select the image that is last viewed by a user as an icon, resulting in a constantly changing icon, which is confusing for a user.

Some media browsers interfaces use an icon that is composed of more than one image, for instance a grid of four images to represent a group of images. However, the selection of these images is also made from the images that are first in the group or have been viewed last.

SUMMARY OF THE INVENTION

Object of the invention is to provide a method and apparatus that automatically generate an icon that is representative for a group of images. In order to obtain this object, the invention provides a method as defined in the outset, characterized in that the method comprises:
  determining a relative importance of each image and
  generating an icon composed of a selection of images based on the determined relative importance of each image.

According to this method, an icon is generated automatically that is representative for the group of images.

It is noted that U.S. 2003/0117651A1 describes a method of creating a photo album, where a photo album is a collection of photos arranged in pages. The method determines the importance of each photo to determine a layout of the album. Pictures with a relatively high importance are, for instance, printed bigger and in the center of a page. The importance of each photo is determined by collecting affective information about each photo. Affective information may be: viewing time, facial expression and/or head movements of the user while watching the photo, physiological reactions, such as heart rate, temperature, galvanic skin response of the user while watching the photo.

U.S. 2003/0117651A1 does describe a method for determining the relative importance of pictures, but only uses this determined importance to prepare a layout for a photo album. The method does not involve any selection of an icon that is representative for a group of images.

According to an embodiment of the invention, the relative importance of each image is determined based on at least one of:
  the time span an image is displayed,
  the presence of manual annotations,
  number of times an image has been selected for a slide show,
  number of copies that have been printed and/or sent,
  explicit user rating,
  rareness in the collection measured using image similarity,
  presence of faces (or other objects) detected with automatic face (object) detection.

These are parameters that give a good indication of the relative importance of an image as experienced by a user and that can easily be recorded.

According to an embodiment of the invention, the number of images that is incorporated in the icon is selected based on the determined relative importance of each image. In the case where a few images seem to be far more important than the other images, these images may be all incorporated in the icon. The number of images incorporated in the icon is thus not fixed, but is adapted to the determined importance.

According to an embodiment of the invention, the layout of the icon is selected based on the determined relative importance of each image. The layout may be adjusted to embody a true account of the determined importance.

According to an embodiment of the invention, the size of each selected image in the icon is proportional to the relative importance of each image. By adjusting the size to the determined importance, the icon gives a true account of the determined importance.

According to an embodiment of the invention, the position of each selected image in the icon depends on the relative importance of each image. For instance, relatively less important images may be positioned further away from the centre of the icon.

According to an embodiment of the invention, the group of images comprises a plurality of stills from a movie. The group of images may also be stills from a movie. The relatively most important stills may be incorporated in the icon representing that movie.

According to an embodiment of the invention, the group of images comprises a plurality of icons, for instance representing a group of images, a movie, a computer program or application. An icon may be generated according to the invention that represents a number of icons. In cases where large quantities of images need to be organized that are mutually arranged in a more complex hierarchic order, such icons, representing a group of icons may be very useful.

According to an embodiment of the invention, the icon is a desktop. The layout of a desktop may be viewed as an icon representing the contents of a computer. Therefore the layout of a desktop may be determined according to this invention. The selection of images, their mutual position, their size etc. may be determined on the basis of the determined importance of each image.

According to an embodiment of the invention, the method further comprises determining a relative order based on the determined relative importance of each image. In the case where the group of images is a group of pictures, the order in which the pictures are presented to a user, may be determined by the determined relative importance, preferably presenting the images in an order of decreasing importance.

According to a further aspect, the invention relates to a computer system comprising processing means and memory means, the processing means being arranged to communicate with the memory means, the computer system being arranged to create an icon, representing a group of images comprising a plurality of images, where the icon is composed of a selection of images from that group of images, characterised in the following the processing means are arranged to determine a relative importance of each image and the processing means are arranged to generate an icon composed of a selection of images based on the determined relative importance of each image.

According to a further aspect, the invention relates to a computer program product to be loaded by a processor in a computer system, the computer system comprising processing means and memory means, the processing means being arranged to communicate with the memory means, the computer program product being arranged to carry out a method for creating an icon, representing a group of images comprising a plurality of images, where the icon is composed of a selection of images from that group of images, characterised in that the method comprises:

determining a relative importance of each image and generating an icon composed of a selection of images based on the determined relative importance of each image.

According to a further aspect, the invention relates to a data carrier comprising a computer program product in accordance with the above.

According to a further aspect, the invention relates to a method for determining a relative order of a group of images comprising a plurality of images, characterised in that the method comprises:

determining a relative importance of each image and determining the relative order based on the determined relative importance of each image. For instance, in the case where the group of images is a group of pictures, the order in which the pictures are presented to an user, may be determined by the determined relative importance, preferably presenting the images in an order of decreasing importance.

BRIEF DESCRIPTION OF THE DRAWINGS

The invention will be explained with reference to some drawings which are only intended to illustrate the present invention and not to limit its scope which is only limited by the appended claims.

DESCRIPTION

According to a preferred embodiment of the invention, the invention is a method comprising the following:

a) computation of image importance,
b) selection of layout,
c) automatic creation of icon, and
d) interactive editing of the icon.

a) Computation of Image Importance

First an importance $I_i$ of each image is determined, where $I_i$ is preferably a number between 0 and 1.

The importance $I_i$ of each image may be determined based on one or more of the following factors:

a time span an image is displayed, a presence of manual annotations, number of times an image has been selected for a slide show, number of copies that have been printed and/or sent, an explicit user rating, rareness in the collection determined using image similarity, presence of faces (or other objects) detected with automatic face (object) detection.

If, for instance, the time span an image has been displayed is taken as a factor for determining the relative importance of an image, the importance $I_i$ of image i is determined by:

$$I_i = \frac{T_i}{T_m},$$

where $T_i$ is the time image i has been displayed and $T_m = \max\{T_1 \ldots T_i \ldots T_N\}$, where N is the number of images that have been displayed (i.e. $T_m$ is the maximum time span of all images having been displayed).

It will be understood that the importance of an image may be determined by using one of these factors, but may also be determined based on a selection of these factors or based on all of these factors. Also other factors from which the importance of an image may be determined could be taken into account without departing from the spirit of the invention.

When more than one factor is taken into account, the importance of an image may be determined by computing a weighted average of the different factors.

The importance of each image may evolve in time. Every time a factor that is taken into account for determining the relative importance of an image changes, the relative importance changes. For instance, every time an image is displayed, the relative importance based on the displaying time span changes.

It is also possible to take into account the time that has passed since a certain factor has last been changed. For instance, in case a certain picture has been displayed very often, but all displaying time has been recorded more than a year ago, while another image has been displayed relatively very often during the last months, this could also be taken into account.

b) Selection of Layout

After the relative importance of each image has been determined, a layout selection 11, 12 can be made for an icon. This selection may be done automatically, but may also be done manually by the user, if he/she desires.

Figure 1A:
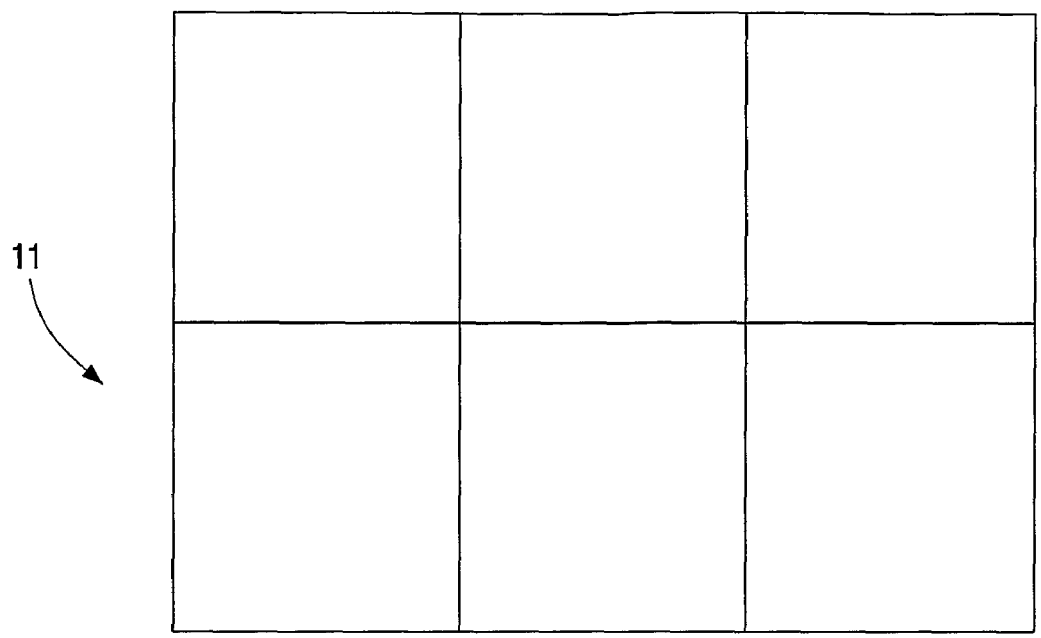
FIGS. 1a and 1b show a first and second layout, that may be used in the invention.
Figure 1B:
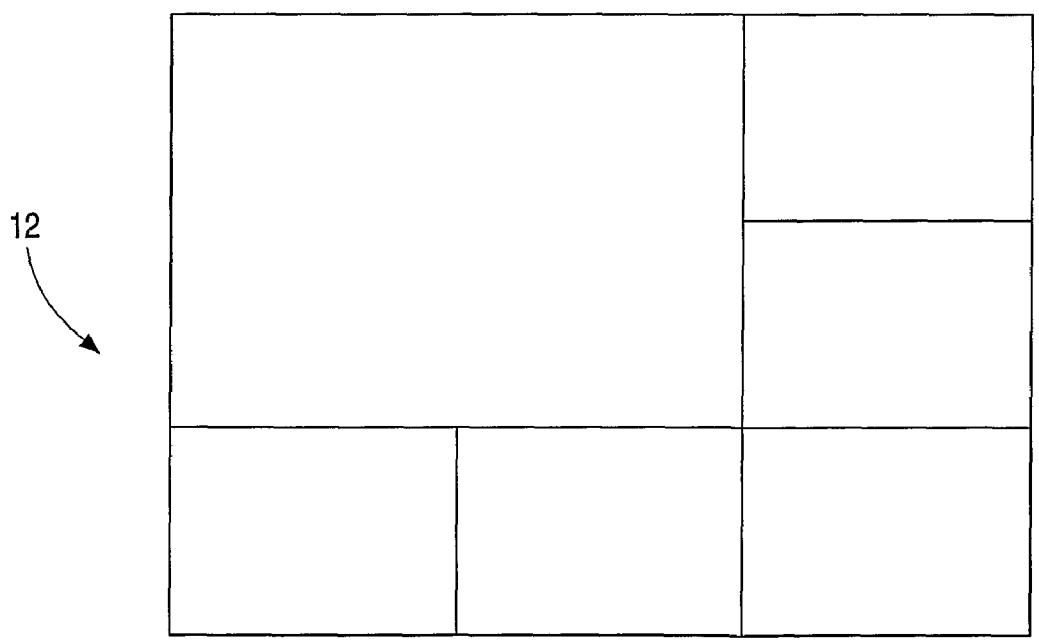

If, for instance, 6 images of a group have a relative importance that is significantly high compared to the other images in that group, these six images are selected for being used to construct an icon. Next, an icon layout may be selected that allows to comprise 6 images. Examples of such icons 11, 12 are shown in FIGS. 1a and 1b. Of course, the icon may further comprise other components, such as a text giving a description of the kind of images being represented by the icon (e.g. "holiday 2001").

If all six selected images have an approximately equal relative importance, the icon layout 11 depicted in FIG. 1a is preferably selected. If one of the six selected images, for instance image, has a relative importance that is significantly higher than the other five selected images the icon layout 12 of FIG. 1b is preferably chosen.

It will be understood that the selection of the number of images that need to be incorporated in the icon can be done in several ways. For instance, it may be required that the sum of the importance of each of the images included in the icon is minimal (i.e., at a minimum) a certain predetermined value. However, also other selection criteria may be applied.

Selecting an icon layout may be done by performing at least two steps:
1) determining the number of images that need to be displayed in the icon, and
2) selecting a matching icon layout from a plurality of icon layouts, for example from a database.

c) Automatic Creation of Icon

After the icon layout has been selected, the pictures may be inserted in the selected icon layout. The size of an image may be directly dependent on its relative importance. Also the distance of an image from the centre of the icon can be made dependent on its relative importance, e.g., the most important image in the centre, surrounded by the less important images.

Further on, all kinds of optional graphical effects may be applied, such as:
- rotation of one or more images,
- partially overlapping of images,
- blending of images,
- addition of frames, borders around images, and
- superimposing of an album title or other metadata such as user annotations.

Figure 2A:
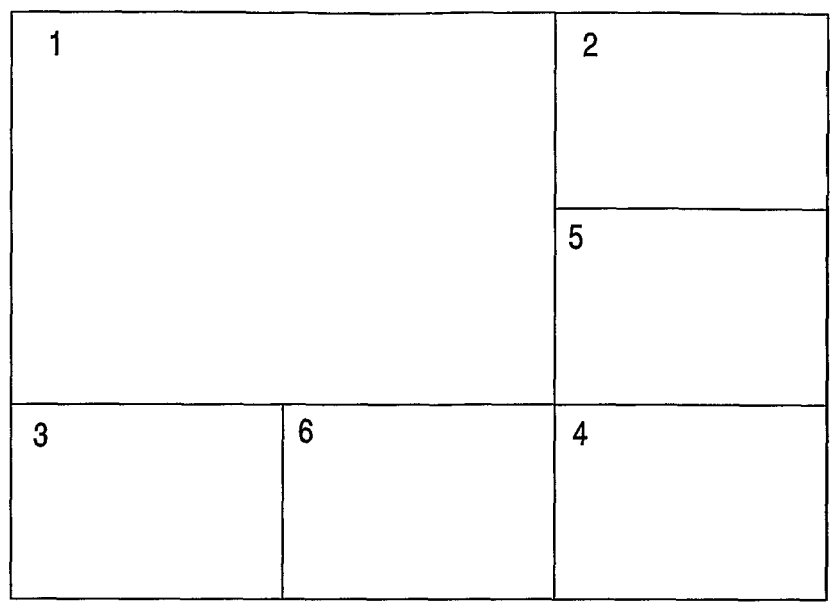
FIGS. 2a and 2b show a first and a second icon generated according to the invention.
Figure 2B:
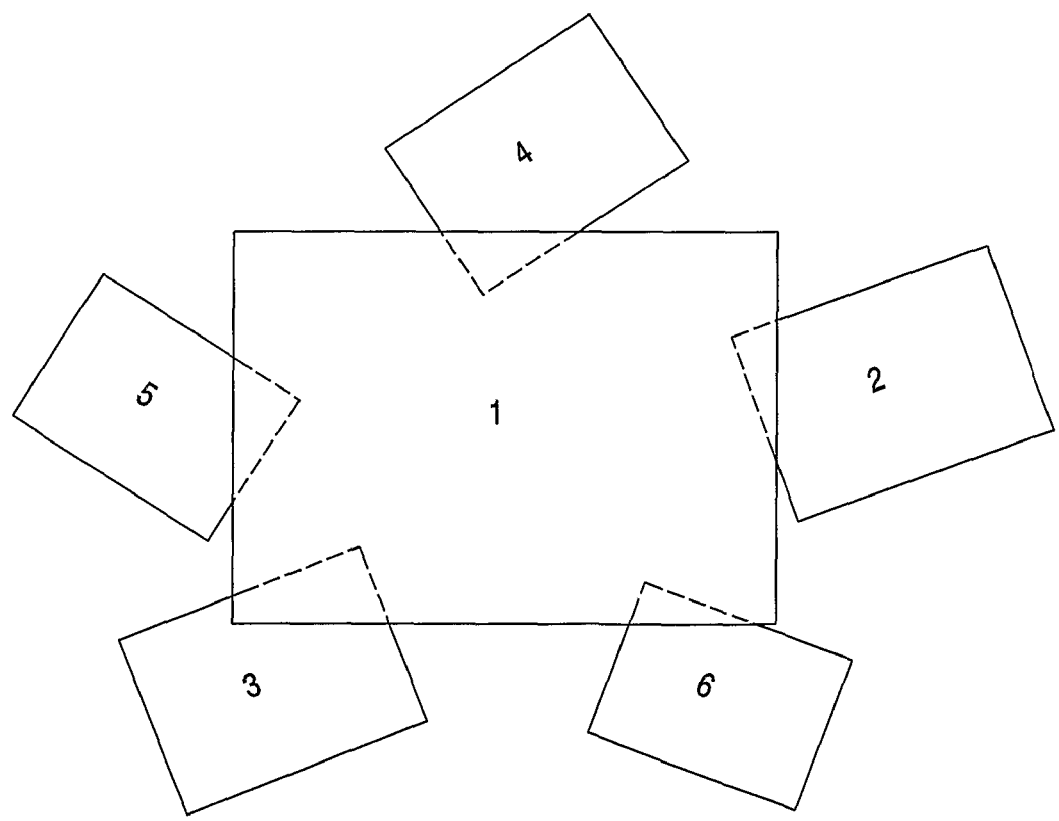

Examples of icons are depicted in FIGS. 2a and 2b, comprising six images 1, 2, 3, 4, 5, 6 where the relative importance $I_1 > I_2 > I_3 > I_4 > I_5 > I_6$.

Again, this is preferably done automatically, but may also be done manually.

d) Interactive Editing of the Icon

Finally, the user may interactively edit the generated icon. The system should preferably allow the user to interactively edit the resulting icon. With a drag and drop function, the user should then be allowed to easily change the layout, the size and order of the images etc.

When resizing an image, the other photos may adapt their size depending on their relative importance. If a user removes a photo from the icon, the following most important image could be automatically selected for substitution.

It will be understood that this last step is optional for users that are not satisfied with the automatically created icon.

The importance of an image could also be made dependent on the user. In case a device, such as a computer, is used by more than one person, the computer may determine relative importance for each image for each user, since each user has a different viewing history.

The method as described here may also be applied to a number of groups with images, instead of to just to a single group of images. For instance, if a user has 3 groups of images containing images about sport, and 2 groups of images containing images about holidays, a first and second icon may be generated representing the sport groups and the holiday groups respectively. After a user has selected, for instance, the icon representing the group of holiday images, two further icons are presented to him, representing the first and second group of holiday images.

Figure 3:
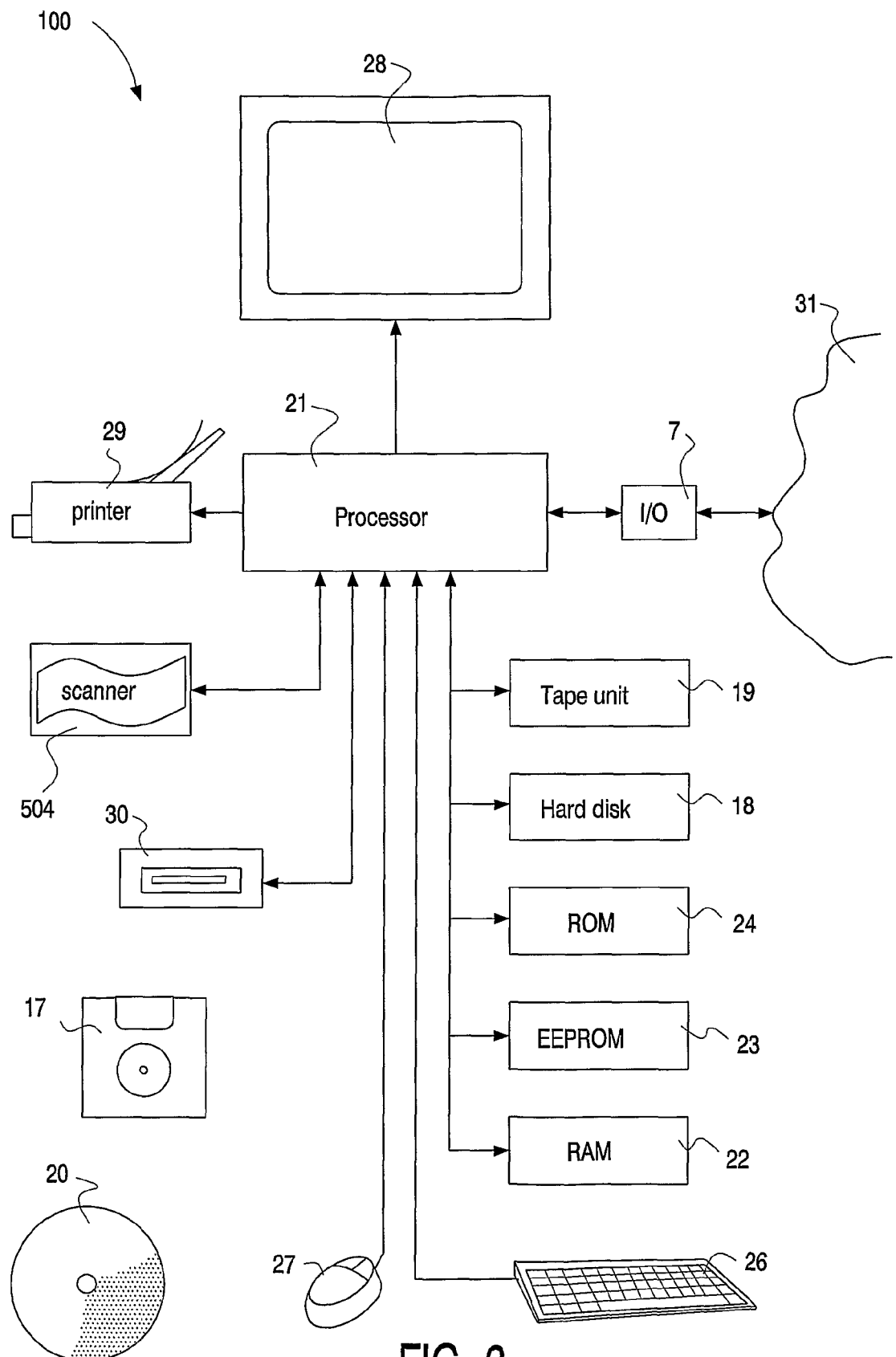
FIG. 3 shows a computer system arranged to be used in the invention.

FIG. 3 shows a schematic block diagram of an embodiment of the computer system 100, comprising processor means 21 for performing arithmetical operations. The processor means 21 are connected to memory units that store instructions and data, such as a tape unit 19, a hard disk 18, a Read Only Memory (ROM) 24, Electrically Erasable Programmable Read Only Memory (EEPROM) 23 and a Random Access Memory (RAM) 22. The processor means 21 are also connected to one or more input devices, such as a keyboard 26 and a mouse 27, one or more output devices, such as a display 28 and a printer 29, an input device such as a scanner 504, and one or more reading units 30 to read for instance floppy disks 17 or CD ROM's 20. The computer system 100 may further comprise an input/output device 7, for providing data traffic with a network 31.

However, it should be understood that there may be provided more and/or other memory units, input devices and read devices known to persons skilled in the art. Moreover, one or more of them may be physically located remote from the processor means 21, if required. The processor means 21 is shown as one box, however, it may comprise several processing units functioning in parallel or controlled by one main processor, that may be located remote from one another, as is known to persons skilled in the art.

It is observed that, although all connections in FIG. 3 are shown as physical connections, one or more of these connections can be made wireless. They are only intended to show that "connected" units are arranged to communicate with one another in someway.

The computer system 100 is shown as a computer system, but can be any signal processing system with analog and/or digital and/or software technology arranged to perform the functions discussed here.

The memory units may contain the program instructions for carrying out the method as described above. The computation of the importance of each image may be carried out according to these program instructions by the processing means 21, as will be understood by a person skilled in the art.

Figure 4:
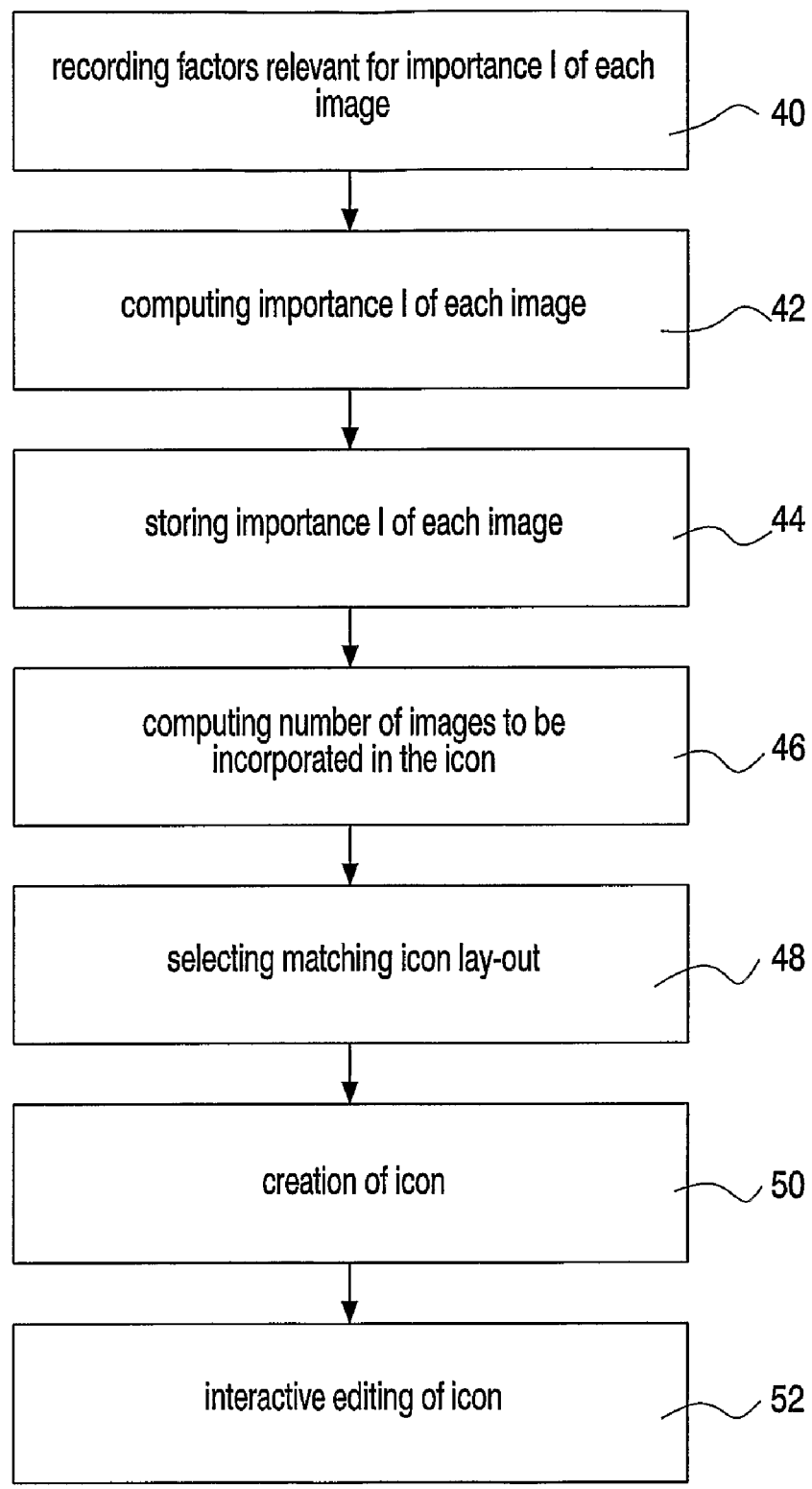
FIG. 4 shows a flow diagram of a computer program according to an embodiment of the invention.

According to an embodiment of the invention, the program instructions are such that a flow diagram as depicted in FIG. 4 is executed.

The computer system 100 first records the factors that are relevant for determining the importance I of each image, such as the time an image is displayed, the presence of manual annotations, number of times an image has been selected for a slide show etc, as already listed above. The recorded factors may be stored in the memory units 19, 18, 24, 23, 22. This is step 40 in FIG. 4.

After the relevant factors are stored in the memory units 19, 18, 24, 23, 22, in step 42 the computer system 100 collects this data and computes the importance I for each image, that is stored in the memory units 19, 18, 24, 23, 22 in step 44. The importance associated to an image may be stored in a table for successive re-use. The importance may also be stored as metadata attached to the images Based on this stored importance I of each image, the computer system 100 determines in step 46 the number of images that need to be incorporated in the icon. The result of this is used in step 48 to select an icon that matches the number of images to be incorporated in the icon. Based on the relative importance of these images, an icon is selected or generated that represents the relative importance of the images.

In step 50, the icon is created and presented to the user. Finally, the user might interactively edit the icon in step 52.

It will be understood that the computer system 100 could be arranged to constantly monitor if any of the relevant factors has changed, so the icon can constantly be monitored. On the other hand, the computer system may also be arranged in such a way that the icon is only changed based on new recorded relevant factors at certain time intervals.

It will further be understood that an image of which the relative importance is determined may be a picture or a drawing, but may also be an icon in itself, as for instance an icon representing a movie, such as a cinema poster, DVD cover, or may be an icon representing a computer program or application, that may be run on a computer.

In the first case, where the image is an icon representing a movie, the relative importance may be determined by the number of times a movie is viewed or copied.

In the second case, where the images are icons representing computer programs or applications, the icon that is generated based on the determined importance of the different images (in this case: the program icons) may be the desktop of a computer. In practice this means that the appearance of the desktop of the computer, i.e. the position, order and selection of displayed icons, is determined by the determined importance of each program icon.

The invention may also be used for creating an icon, where the group of images together forms a movie. The icon is than composed of a selection of images from that movie, i.e. a selection of stills from the movie. The relative importance of each still is determined and an icon is generated based on the determined relative importance of each image. The relative importance may be based in a similar way as described above. The group of images may also be a predetermined number of stills from a movie, from which the relative importance is determined.

According to a further aspect of the invention, the determined relative importance of the different images may also be used to adjust the order in which the images are stored or presented to the user. For instance, when a user wants to view all the images of a certain group, the order in which the images are presented to the user may be presented to the user in order of decreasing importance. This may help the user to find a certain image more quickly. This aspect of the invention may be applied in combination with the above described method for generating an icon, but may also be applied separately.

For the purpose of teaching the invention, preferred embodiments of the method and devices of the invention were described above. It will be apparent for the person skilled in the art that other alternative and equivalent embodiments of the invention can be conceived and reduced to practice without departing from the true spirit of the invention, the scope of the invention being only limited by the annexed claims.

The invention claimed is:

1. A method for creating an icon, the method comprising:
   determining a relative importance $(I_1, \ldots I_N)$ of each image $(1, 2, \ldots N)$ of a group of images, wherein the group of images includes a plurality of images $(1, 2, \ldots, N)$, and wherein the relative importance $I_i$ (for i=1 to N) of each image of the plurality of images $(1,2,\ldots,N)$ is a number between 0 and 1; and generating the icon automatically in response to determining the relative importance of each image of the group of images, wherein the icon comprises a graphic in a graphical user interface to represent the group of images, wherein the graphic is composed of an adapted selection of images selected from the group of images based on the determined relative importance of each image of the group of images, wherein relative importance of each image evolves and changes every time a factor taken into account for determining the relative importance of the corresponding image changes, and wherein the number of images that are selected to be incorporated in the icon is not fixed, but is an adapted number based on the determined relative importance $(I_1 \ldots I_N)$ of each image $(1, 2, \ldots N)$, further wherein the adapted number of images incorporated in the icon is selected based on a sum of the relative importance of each of the images included in the icon being, at a minimum, a certain predetermined value.

2. The method of creating an icon according to claim 1, wherein the relative importance of each image $(1, 2, \ldots, N)$ is determined based on at least one of:
   a time span an image is displayed,
   a presence of manual annotations in an image,
   a number of times an image has been selected for a slide show,
   a number of copies of an image that have been (i) printed, (ii) sent, or (iii) printed and sent,
   an explicit user rating of an image,
   a rareness of an image in the group of images measured using image similarity,
   a presence of faces in an image detected with automatic face detection, and
   a presence of other objects in an image detected with automatic object detection.

3. The method according to claim 1, wherein a layout of selected images of the icon is selected based on the determined relative importance of each image of the selected images.

4. The method according to claim 1, wherein a size of each selected image in the icon is proportional to the determined relative importance of each image of the selected images.

5. The method according to claim 1, wherein a position of each selected image in the icon depends on the determined relative importance of each image of the selected images.

6. The method according to claim 1, wherein the group of images comprises a plurality of stills from a movie.

7. The method according to claim 1, wherein the group of images comprise a plurality of icons, the plurality of icons representing a group of images, a movie, and a computer program or application.

8. The method according to claim 7, wherein the icon is a desktop.

9. The method according to claim 1, further comprising:
   determining a relative order of selected images in the icon based on the determined relative importance of each image of the selected images.

10. A computer system comprising processing means and memory means, the processing means being arranged to communicate with the memory means, the computer system being arranged to create an icon, wherein
   the processing means determines a relative importance $(I_1, \ldots I_N)$ of each image $(1, 2, \ldots N)$ of a group of images, wherein the group of images includes a plurality of images $(1, 2, \ldots, N)$, and wherein the relative importance $I_i$ (for i=1 to N) of each image of the plurality of images $(1,2,\ldots,N)$ is a number between 0 and 1; and the processing means generates the icon automatically in response to determining the relative importance of each image of the group of images, wherein the icon comprises a graphic in a graphical user interface to represent the group of images, wherein the graphic is composed of an adapted selection of images selected from the group of images based on the determined relative importance of each image of the group of images, wherein relative importance of each image evolves and changes every time a factor taken into account for determining the relative importance of the corresponding image changes, and wherein the number of images that are selected to be incorporated in the icon is not fixed, but is an adapted number based on the determined relative importance $(I_1, \ldots I_N)$ of each image $(1, 2, \ldots N)$, further wherein the adapted number of images incorporated in the icon is selected based on a sum of the relative importance of each of the images included in the icon being, at a minimum, a certain predetermined value.

11. A computer program product to be loaded by a processor in a computer system, the computer system comprising processing means and memory means, the processing means being arranged to communicate with the memory means, the computer program product being arranged to carry out a method for creating an icon, wherein the method comprises:
   determining a relative importance $(I_1, \ldots I_N)$ of each image $(1, 2, \ldots N)$ of a group of images, wherein the group of images includes a plurality of images $(1, 2, \ldots, N)$, and wherein the relative importance $I_i$ (for i=1 to N) of each image of the plurality of images $(1, 2, \ldots, N)$ is a number between 0 and 1; and
   generating the icon automatically in response to determining the relative importance of each image of the group of images, wherein the icon comprises a graphic in a graphical user interface to represent the group of images, wherein the graphic is composed of an adapted selection of images from the group of images based on the determined relative importance of each image of the group of images, wherein relative importance of each image evolves and changes every time a factor taken into account for determining the relative importance of the corresponding image changes, and wherein the number of images that are selected to be incorporated in the icon is not fixed, but is an adapted number based on the determined relative importance $(I_1, \ldots I_N)$ of each image $(1, 2, \ldots N)$, further wherein the adapted number of images incorporated in the icon is selected based on a sum of the relative importance of each of the images included in the icon being, at a minimum, a certain predetermined value.

12. A data carrier comprising a computer program product in accordance with claim 11.

13. A method for determining a relative order of selected images contained within an icon, the method comprising:
   determining a relative importance $(I_1, \ldots I_N)$ of each image $(1, 2, \ldots N)$ of a group of images, wherein the group of images includes a plurality of images $(1, 2, \ldots, N)$, and wherein the relative importance $I_i$ (for i=1 to N) of each image of the plurality of images $(1, 2, \ldots, N)$ is a number between 0 and 1;
   generating the icon automatically in response to determining the relative importance of each image of the group of images, wherein the icon comprises a graphic in a graphical user interface to represent the group of images, wherein the graphic is composed of an adapted selection of images selected from the group of images based on the determined relative importance of each image of the group of images, wherein relative importance of each image evolves and changes every time a factor taken into account for determining the relative importance of the corresponding image changes, and wherein the number of images that are selected to be incorporated in the icon is not fixed, but is an adapted number based on the determined relative importance $(I_1, \ldots I_N)$ of each image $(1, 2, \ldots N)$, further wherein the adapted number of images incorporated in the icon is selected based on a sum of the relative importance of each of the images included in the icon being, at a minimum, a certain predetermined value; and
   determining the relative order of selected images in the icon based on the determined relative importance of each image of the selected images.

14. The method according to claim 13, wherein the relative importance of each image $(1, 2, \ldots, N)$ is determined based on at least one of:
   a time span an image is displayed,
   a presence of manual annotations in an image,
   a number of times an image has been selected for a slide show,
   a number of copies of an image that have been (i) printed, (ii) sent, or (iii) printed and sent,
   an explicit user rating of an image,
   a rareness of an image in the group of images measured using image similarity,
   a presence of faces in an image detected with automatic face detection, and
   a presence of other objects in an image detected with automatic object detection.

* * * * *